United States Patent
Noirot et al.

(10) Patent No.: US 7,694,509 B2
(45) Date of Patent: Apr. 13, 2010

(54) METHOD AND DEVICE FOR REGENERATING A PARTICLE FILTER INTEGRATED INTO AN EXHAUST LINE OF AN INTERNAL COMBUSTION ENGINE

(75) Inventors: Rémi Noirot, Nevers (FR); Michel Castagne, Nanterre (FR); Jean-Baptiste Dementhon, Paris (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 10/580,432

(22) PCT Filed: Nov. 23, 2004

(86) PCT No.: PCT/FR2004/002983

§ 371 (c)(1),
(2), (4) Date: Feb. 7, 2007

(87) PCT Pub. No.: WO2005/052331

PCT Pub. Date: Jun. 9, 2005

(65) Prior Publication Data

US 2007/0271902 A1    Nov. 29, 2007

(30) Foreign Application Priority Data

Nov. 24, 2003 (FR) .................... 03 13835

(51) Int. Cl.
*F01N 3/00* (2006.01)
(52) U.S. Cl. .............. 60/295; 60/274; 60/276; 60/297; 60/301
(58) Field of Classification Search ........... 60/274, 60/276, 285, 295, 297, 301
See application file for complete search history.

(56) References Cited

U.S. PATENT DOCUMENTS

| 4,450,682 | A | 5/1984 | Sato et al. |
| 4,651,524 | A | 3/1987 | Brighton |
| 5,195,319 | A | 3/1993 | Stobbe |
| 6,988,361 | B2 * | 1/2006 | van Nieuwstadt et al. ..... 60/295 |
| 7,054,734 | B2 * | 5/2006 | Todoroki et al. ............ 701/105 |
| 7,207,171 | B2 * | 4/2007 | Nagaoka et al. ............... 60/295 |
| 7,254,940 | B2 * | 8/2007 | Saitoh et al. .................. 60/295 |

FOREIGN PATENT DOCUMENTS

| EP | 0405312 | 1/1991 |
| FR | 2825412 | 12/2002 |
| FR | 2829526 | 3/2003 |

* cited by examiner

*Primary Examiner*—Binh Q Tran
(74) *Attorney, Agent, or Firm*—Antonelli, Terry, Stout & Kraus, LLP.

(57) ABSTRACT

The invention relates to a method for regenerating a particle filter (10) integrated into an exhaust line (12) of an internal combustion engine (34), wherein the exhaust gas flows into the filter via an inflow surface (16) and exit the filter via an outflow surface (18). According to the invention, the internal temperature of at least two regions of the filter (10) is monitored during regeneration of the filter; the oxygen content of the exhaust gas is reduced if at least one of the monitored temperatures rises above a critical temperature; the oxygen content of the exhaust gas is increased in order to continue regeneration if all of the monitored temperatures are below said critical temperature.

8 Claims, 3 Drawing Sheets

METHOD AND DEVICE FOR REGENERATING A PARTICLE FILTER INTEGRATED INTO AN EXHAUST LINE OF AN INTERNAL COMBUSTION ENGINE

BACKGROUND OF THE INVENTION

The present invention relates to a method and a device for regenerating a particle filter built into an exhaust line of an internal combustion engine, particularly of the diesel type.

It relates in particular to a method and a device for regulating the heat release, or exotherm, of the particle filter.

In general, a particle filter is used to pick up particles and soot contained in the exhaust gases and prevent them from being released into the atmosphere. However, these particles and soots have the property of clogging the filter after a certain usage period and causing back-pressure to build up in the exhaust line, which may cause an engine malfunction.

It is known that as soon as this filter reaches a predetermined clogging level, a filter regeneration sequence is triggered, generally by the engine control. This regeneration sequence consists essentially of burning the particles and soots present in this filter. For this purpose, the temperature of the exhaust gases passing through the filter is raised temporarily to assist with combustion of these particles, this combustion generally being exothermic. The duration of this gas temperature rise depends on the increase in back-pressure of the gases in the exhaust line.

One method of raising this temperature consists of having the engine operate in lean mode, i.e. with richness less than 1, so that the oxygen present in the exhaust gases participates also in combustion of the particles and soots contained in the filter.

However, the combustion inside the filter cannot be controlled, which can lead to very high temperatures inside it. These temperatures can cause the material of which the filter is made to deteriorate or even be destroyed.

The problem is even more significant when other functions are built into this filter. In particular, the filter can be used as a substrate for catalysts such as platinum or rhodium to convert the gas pollutants present in the exhaust gases, such as carbon oxides (CO), unburned hydrocarbons (HC), or nitric oxides (NOx). In this configuration, when the catalyzed particle filter is regenerated, the internal exotherm of this filter is increased by catalytic conversion not only of the COs and HCs in the exhaust gases but also of the HCs that desorb from the internal structure of the particles and the COs resulting from combustion of these particles and soots. This has the drawback of causing deterioration of the catalytic phases present on this filter, which can no longer fulfill their function of converting the polluting gaseous phases present in the exhaust gases.

Document FR 2,829,526 teaches monitoring the temperature of the particle filter by a temperature sensor disposed in or downstream of this filter. When a temperature threshold is reached, the combustion of the particles and soots is limited or even stopped by reducing the concentration of the oxygen present in the exhaust gases passing through this filter.

Such an arrangement, although it is satisfactory, has the non-negligible drawback of not giving a true representation of the various temperatures prevailing in various regions of the filter, mainly when the temperature sensor is disposed downstream of the filter. When there is a local temperature elevation inside the filter, the sensor downstream of the filter cannot pick up such an increase and the regeneration continues, with the risk of locally degrading the filter. Also, the sensor inside the filter can pick up the temperature only in a very particular spot in the filter.

BRIEF SUMMARY OF THE INVENTION

The goal of the present invention is to overcome the drawbacks referred to above by simple, effective management of the exotherm of the particle filter, even when this filter is catalyzed.

For this purpose, the present invention proposes a method for regenerating a particle filter built into an exhaust line of an internal combustion engine, with the exhaust gases passing through the filter from an inflow face to an outflow face, characterized in that, during filter regeneration, the internal temperature of at least two regions of the filter is monitored, the oxygen level of the exhaust gases is reduced when at least one of the temperatures monitored is greater than a critical temperature, and the oxygen level of the exhaust gases is increased to continue filter regeneration when all the temperatures monitored are less than the critical temperature.

Advantageously, the internal temperature of a region of the filter can be monitored near its inflow face.

The internal temperature of a region of the filter can also be monitored near its outflow face.

The internal temperature of a middle region of the filter can also be monitored.

When desulfation of a NOx trap is performed, the internal temperature of at least two regions of the filter can be monitored after desulfation of the trap.

Preferably, the oxygen level of the exhaust gases can be reduced by operating the engine in rich mode.

The oxygen level of the exhaust gases can be increased by operating the engine in lean mode.

The invention also relates to a device for regenerating a particle filter built into an exhaust line of an internal combustion engine, said filter having an exhaust gas inflow face and outflow face, characterized by including at least two temperature sensors located inside the filter.

Preferably, a temperature sensor can be placed in the vicinity of the inflow face of the filter.

Likewise, a temperature sensor can be placed in the vicinity of the outflow face of the filter.

Advantageously, a temperature sensor can be placed in a middle region of the filter.

The particle filter can include catalytic phases for treating pollutants contained in the exhaust gases.

BRIEF DESCRIPTION OF THE DRAWINGS

The other features and advantages of the invention will emerge from reading the description hereinbelow, provided only as an illustration and not limitatively, with reference to the drawings.

DETAILED DESCRIPTION OF THE INVENTION

Figure 1:
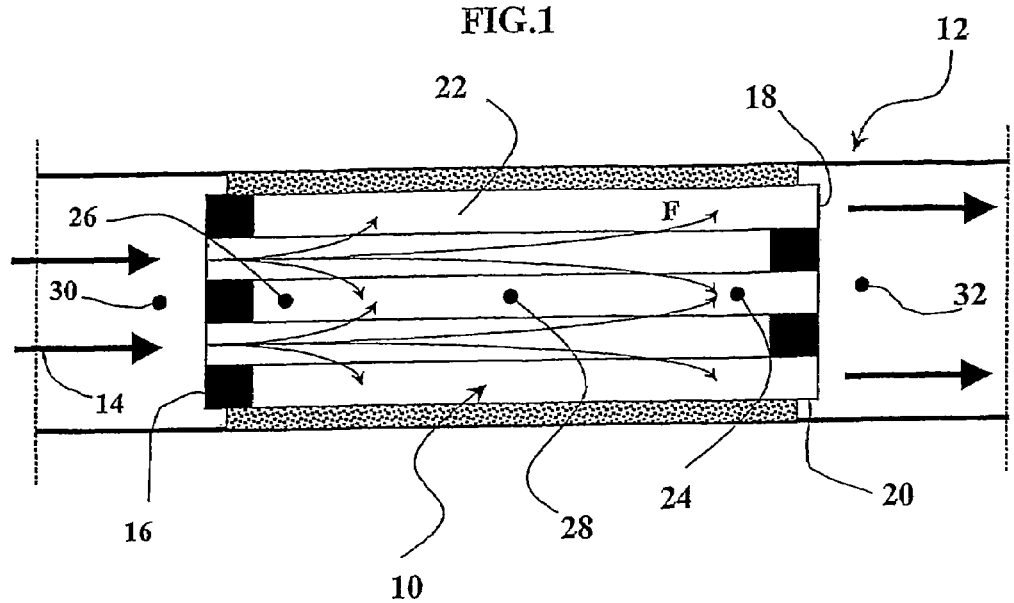
FIG. 1 shows schematically a regeneratable particle filter according to the invention.

In FIG. 1, the particle filter 10 is accommodated in an exhaust line 12. This filter is traversed by the exhaust gases 14 which circulate, as indicated by the arrows, from the inflow face 16 of the filter to its outflow face 18. As is known of itself, the filter is made of a monolith 20 having channels 22 disposed in the circulation direction of gases 14. As an example, as can be seen in FIG. 1, some of the channels are obstructed at the inflow face 16 while others are obstructed at the outflow face 18 in order to achieve circulation of the exhaust gases in this filter, as illustrated by arrows F.

Of course, without thereby departing from the invention, the channels 22 of this monolith can be coated with catalytic phases for converting the polluting gas phases of the exhaust gases, such as CO, HC, or NOx.

In view of the large volume of the particle filter, which can be greater than three liters, and the heterogeneity of the particle and soot deposits along channels 22 and hence burnup of these particles when the filter is regenerated, the internal temperature of this filter is monitored in at least two regions.

In practice, several temperature sensors are disposed in the filter to monitor these temperatures, preferably in one of channels 22.

More specifically, a temperature sensor 24, known as the downstream sensor, is placed in a region at a short distance, approximately 3 cm, from the outflow face 18. This sensor controls the internal temperature of the filter with a longitudinal temperature gradient of less than 200° C. It is generally at this spot where the temperature resulting from particle and soot combustion is at its maximum. Moreover, if a particle filter coated with catalytic phases is used, it is also at this spot that the maximum temperature resulting from particle combustion is increased still further by catalytic conversion of the exhaust gas pollutants such as CO and/or HCs.

A temperature sensor 26, known as the upstream sensor, is located in another region of the filter and at an axial distance from the downstream sensor. This sensor is accommodated in a region at a short distance, also about 3 cm, from the inflow face 16 of the filter. This sensor regulates the internal thermal gradient of the filter with an amplitude less than 100° C. This is the point where the exotherm of the filter corresponding mainly to catalysis of polluting phases of the CO, HC, or NOX type is concentrated when its filter is catalyzed.

A temperature sensor 28, known as the central sensor, is positioned essentially in the middle zone of the filter. This sensor gives information on the temperature gradient with an amplitude less than a few tens of degrees.

Advantageously, a temperature sensor 30 upstream of the filter as well as a temperature sensor 32 downstream of this filter are also provided.

Figure 2:
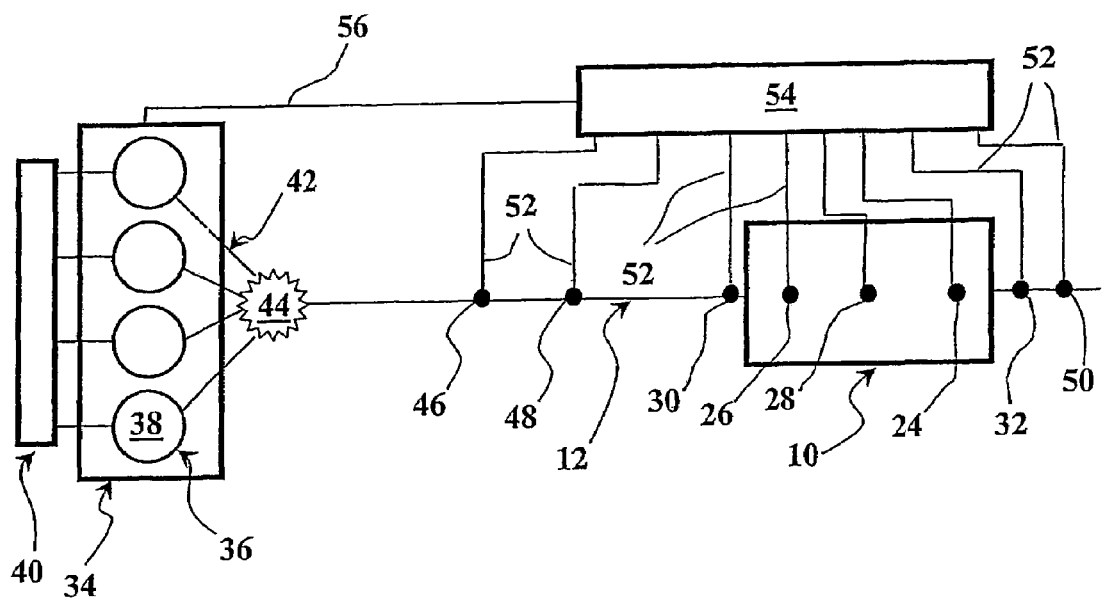
FIG. 2 is a schematic view of an internal combustion engine using the particle filter in FIG. 1.

With reference to FIG. 2, this filter and these sensors are located in the exhaust line 12 of an internal combustion engine 34, particularly of the Diesel type.

This engine has at least one cylinder 36 with a combustion chamber 38, means 40 for supplying the combustion chambers with fuel, and means for exhausting the burned gases 42, connected to the exhaust line 12. Advantageously, a supercharger 44 such as a turbocompressor can be disposed between the outflow of the exhaust gases from the engine and the particle filter 10.

The exhaust line also has a probe λ 46 upstream of the filter serving to measure the value λ of the exhaust gases, a pressure sensor 48 sensing the exhaust gases and located downstream of the filter, and another gas pressure sensor 50 disposed downstream of the particle filter. The pressure sensors measure the pressure drop of the exhaust gases between the inlet 16 and the outlet 18 of the particle filter 10.

The various sensors and the probe are connected by lines 52 to a control unit 54, known as the engine control. This unit is also connected to the engine by a two-directional line 56 giving information at all times on engine function, such as engine speed. Unit 54 also transmits, via line 56, once the signals received from the sensors and probe have been processed, commands to the various engine elements that affect engine operation such as the fuel injector 40 and/or air admission (not shown).

To evaluate the status of charging with particles present in the particle filter 10, unit 54 receives signals representing the pressure upstream and downstream of filter 10 through pressure sensors 48 and 50. This unit calculates the pressure loss of the exhaust gases between the upstream. and downstream sides of the particle filter 10 and evaluates the degree of filter clogging, for example through a model stored in unit 54. If this level reaches a threshold value, the particle filter regeneration sequence is triggered and the control unit sends instructions over line 56 to certain engine elements 34 causing this engine to go into lean combustion mode with an increasing richness determined to be less than 1. For example, the richness of the exhaust gases is such that it does not exceed a richness of 0.95, although its composition is oxidizing to consume the particle and soot deposits present in this filter. This can be done by post-injection of fuel into combustion chambers 38 of cylinders 34 by fuel supply means 40. This increase in richness enables the temperature of the exhaust gases to be increased to a temperature of approximately 450° C. to ensure regeneration of the particle filter.

Of course, this clogging threshold can be determined by any other means, such as models taking into account the distance traveled by the vehicle since the last regeneration or the operating life of the filter.

Figure 3:
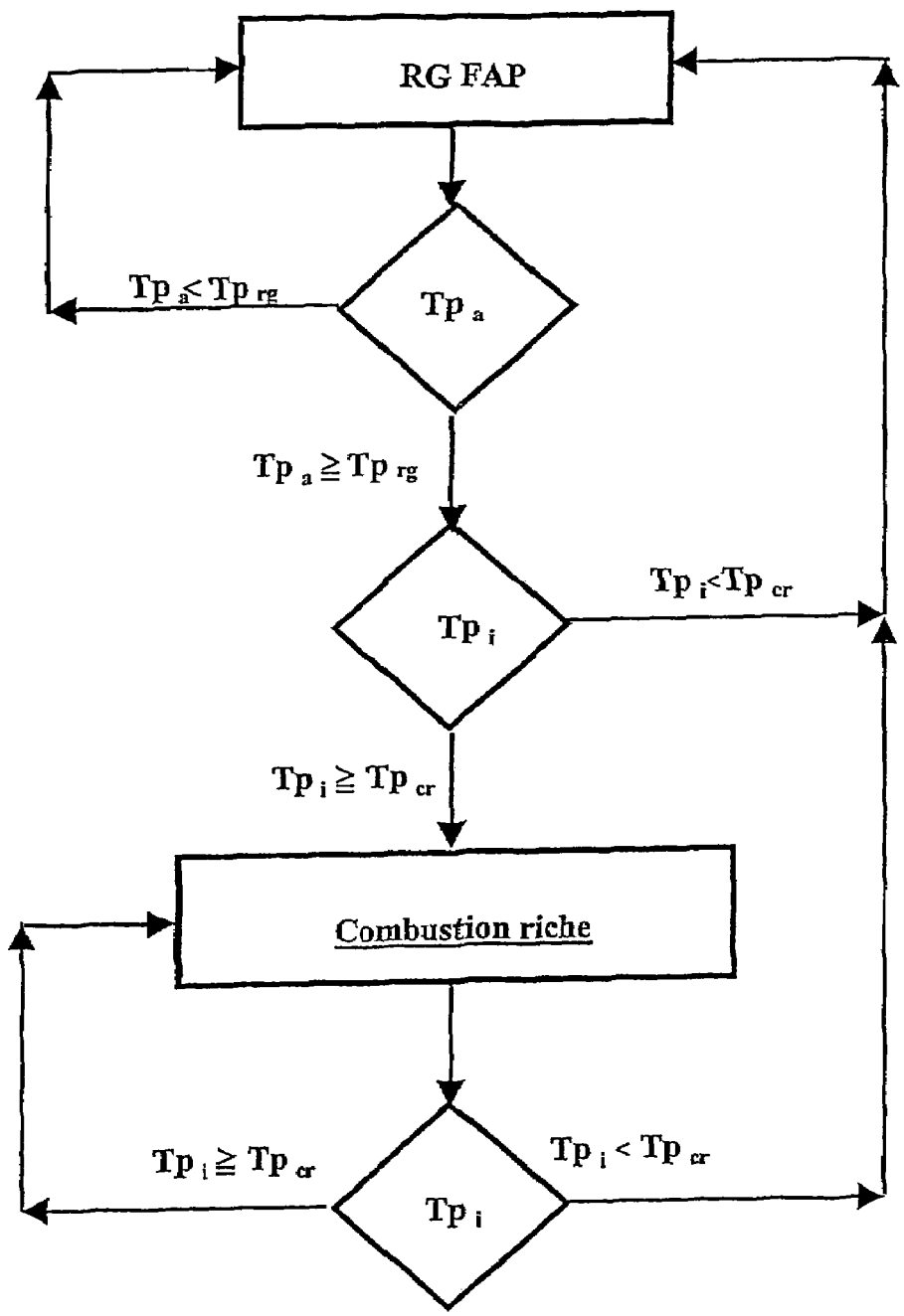
FIG. 3 is a flowchart showing the various steps of filter regeneration.

Starting at this time, with reference to FIG. 3, the control unit 54 triggers the regeneration sequence of the particle filter [RG FAP]. Starting at this point, the unit checks, by means of sensor 30, to see whether the gas temperature upstream of the filter [$Tp_a$] corresponds to the temperature necessary for regenerating the filter [$Tp_{rg}$] to ensure combustion of the particles present in the filter and, through probe 46, whether the richness of the exhaust gases is that required to achieve this temperature. If not, the unit sends instructions to the engine elements such as the fuel injector to achieve this temperature and this richness. If the temperature [$TP_a$] upstream of the filter is greater than or equal to the regeneration temperature [$Tp_{rg}$], the unit looks at the internal temperatures of the various regions of the filter [$Tp_i$] using internal sensors 24, 26, and 28. If none of these internal temperatures reaches the critical temperature threshold [$Tp_a$], regeneration of the filter continues with the parameters defined. If at least one of these temperatures reaches or exceeds the critical threshold [$Tp_a$], unit 54 commands the engine elements through line 56 such that the combustion in the engine goes into rich mode with a richness greater than 1 (for example 1.5) thus reducing the oxygen concentration in the exhaust gases. The effect of this is to reduce the amount of oxygen that can be burned with the particles and reduces the filter internal temperatures.

After this step, if all the internal temperatures [$Tp_i$] of the filter picked up by sensors 24, 26, 28 are below the critical temperature threshold [$TP_a$], then filter regeneration continues, passing into the lean combustion mode of the engine with a richness as defined when the filter regeneration phase [RG FAP] is started. If at least one of the internal temperatures [$Tp_i$] is greater than this threshold, unit 54 acts through line 56 on the engine elements such that the richness increases still further, reducing the oxygen level of the gases passing through the filter so that combustion of the particles and soots in the filter is calmed or even arrested and appropriate temperatures are obtained in all the regions of the filter.

Thus, in the filter regeneration sequence, which lasts several minutes, there will be a sequence of engine rich/lean combustion modes to control the exotherm of this filter.

Of course, this exotherm control when the filter is regenerated can apply equally to a non-catalyzed and a catalyzed filter.

Figure 4:
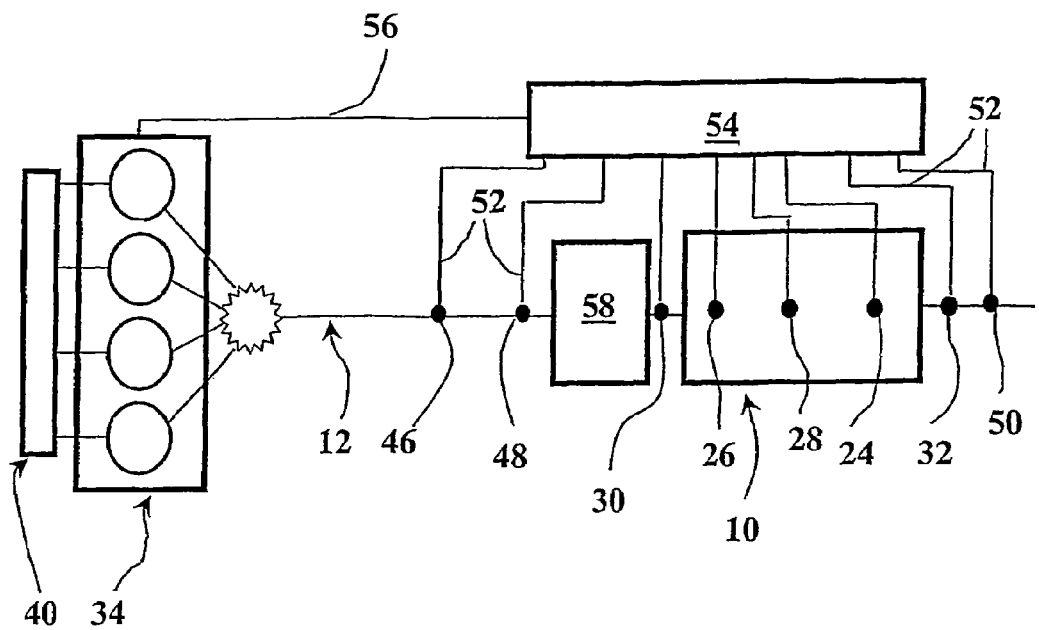
FIG. 4 is a variant of FIG. 2.

FIG. 4 shows a variant of the engine in FIG. 2 so that it has essentially the same reference numerals.

In this variant, the exhaust line 12 additionally has a catalyst 58 on which nitric oxides build up, known as a NOx trap. This NOx trap 58 is located upstream of particle filter 10 in the circulation direction of the exhaust gases, and the pressure sensor 48 is located upstream of this trap while the temperature sensor 30 is located between trap 58 and filter 10.

During the trap desulfation and particle filter regeneration phases, as described as an example in French Patent Application No. 2,825,412, the NOx trap is traversed by exhaust gases reaching very high temperatures, approximately 750° C.

When they exit this trap, these gases, which have stayed at essentially the same temperature, pass through the particle filter and participate in the filter temperature rise when the particles and soot present in this filter are burned. If the temperature rises exceeds a predetermined threshold, this filter can be seriously damaged or even destroyed.

Regulation of the particle filter exotherm during filter regeneration is hence necessary for it to retain its entire regeneration and conversion capacity in the case where this filter is catalyzed.

As stated above, the control unit 54 evaluates the degree of filter 10 clogging due to the pressure loss measured by pressure sensors 48 and 50 and if this level reaches a threshold value the particle filter regeneration sequence is started.

Figure 5:
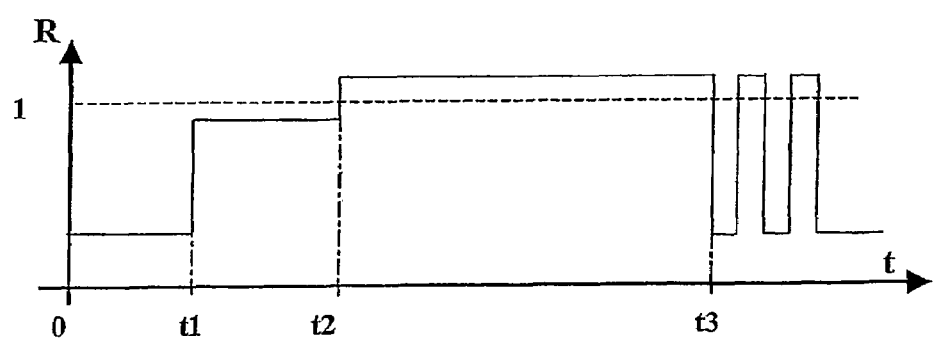
FIG. 5 is a graph showing the changes in richness (R) as a function of time (t) when the filter used in FIG. 4 is regenerated.

Simultaneously, with reference to FIG. 5, at time t1 a NOx trap desulfation sequence is performed with the particle filter regeneration sequence even if the NOx trap has not reached a sulfur saturation threshold.

At the regeneration and desulfation sequences, the engine control unit 54 sends instructions to the engine elements for the latter to operate in lean combustion mode with, between times t1 and t2, an increase in richness up to a value less than 1, which generates an increase in exhaust gas temperature up to about 450° C. Next, between times t2 and t3, the engine operates in rich mode because of another increase in richness above 1 to ensure desulfation of the NOx trap above a temperature of approximately 600° C.

At time t3, desulfation of trap 22 is performed and the temperature of the exhaust gases leaving this trap is at a level such that the control unit looks at the internal temperatures of the various filter regions, by means of internal sensors 24, 26, and 28. If none of these internal temperatures reaches the critical temperature threshold, filter regeneration continues with the parameters defined. If not, unit 54 controls the engine elements via line 56 such that combustion in the engine goes into rich mode as described above in relation to FIG. 3.

Thus, at the time of the filter regeneration sequence, we find, starting at time t3, a sequence of engine rich/lean combustion modes enabling the exotherm of this filter to be controlled, as illustrated in FIG. 5.

The present invention is not confined to the examples described but encompasses all equivalents and variants.

The invention claimed is:

1. A method for regenerating a particle filter built into an exhaust line of an internal combustion engine, with the exhaust gases passing through the filter from an inflow face to an outflow face, characterized in that comprising the steps of, during filter regeneration:

monitoring the internal temperature of at least two regions within the filter between the inflow face and outflow face is monitored;

operating a control unit to receive the internal temperatures of the at least two regions within the filter and to command the internal combustion engine to operate in rich mode to reduce the oxygen level of the exhaust gases when at least one of the temperatures monitored is greater than a critical temperature and to command the internal combustion engine to operate in lean combustion mode to provide an increased oxygen level of the exhaust gases when all the temperatures monitored are less than the critical temperature;

reducing the oxygen level of the exhaust gases when at least one of the temperatures monitored is greater than a critical temperature; and continuing to provide an increased oxygen level of the exhaust gases to continue filter regeneration when all the temperatures monitored are less than the critical temperature.

2. Regeneration method according to claim 1, characterized in that the internal temperature of one region of the filter is monitored near its inflow face.

3. Regeneration method according to claim 1, characterized in that the internal temperature of one region of the filter is monitored near its outflow face.

4. Regeneration method according to claim 1, characterized in that the internal temperature of a middle region of the filter is monitored.

5. Regeneration method according to claim 1, wherein desulfation of a NOx trap is performed, characterized in that the internal temperature of at least two regions of the filter is monitored after desulfation of the NOx trap.

6. Regeneration method according to claim 2, characterized in that the internal temperature of one region of the filter is monitored near its outflow face.

7. Regeneration method according to claim 6, characterized in that the internal temperature of a middle region of filter is monitored.

8. Regeneration method according to claim 1, wherein the at lest two regions are spaced axially from one another.

\* \* \* \* \*